United States Patent [19]
Tantlinger

[11] 3,744,186
[45] July 10, 1973

[54] VEHICLE WINDOW STRUCTURE
[75] Inventor: Keith W. Tantlinger, Rancho Sante Fe, Calif.
[73] Assignee: Rohr Corporation, Chula Vista, Calif.
[22] Filed: Nov. 19, 1970
[21] Appl. No.: 90,940

[52] U.S. Cl................... 49/463, 52/501, 98/2.09
[51] Int. Cl............................................. E06b 7/18
[58] Field of Search.................. 49/463, 464, 466; 52/208, 499, 500, 501, 502; 292/256.71; 98/2.04, 2.09, 2.19, 4, 8, 10, 13, 14, 19

[56] References Cited
UNITED STATES PATENTS
| | | | |
|---|---|---|---|
| 3,237,545 | 3/1966 | Gillick et al. | 98/10 |
| 2,799,902 | 7/1957 | Muller | 98/2.09 |
| 2,677,155 | 5/1954 | Wise | 98/2.09 |
| 1,027,675 | 5/1912 | Viberg | 49/466 X |

FOREIGN PATENTS OR APPLICATIONS
| | | | |
|---|---|---|---|
| 290,520 | 6/1965 | Netherlands | 52/501 |
| 1,395,070 | 3/1965 | France | 52/500 |

Primary Examiner—David J. Williamowsky
Assistant Examiner—Philip C. Kannan
Attorney—George E. Pearson

[57] ABSTRACT

A window opening in a mass transit type railway car has an extrusion fitted marginally along the inward side of each edge thereof, each extrusion having an inwardly open angle seat to receive a rubber bezel fitted around the edge of a window glass. A pressure strip of Z-cross-sectional shape has its flat, intermediate portion mounted to bear against the inner side of the bezel, and a screw support member is removably attached to the extrusion inwardly of the Z-section strip. A screw is threadedly mounted in each support member to bear endwise against the Z-section strip, thereby anchoring the screw support members to the extrusion and urging the Z-section strip into squeezing, seating engagement with the bezel. A removable angle trim member covers and conceals the screw support members, the Z-section strip and the pressure screws.

1 Claim, 2 Drawing Figures

INVENTOR.
KEITH W. TANTLINGER
BY
George E. Pearson
ATTORNEY

VEHICLE WINDOW STRUCTURE

BACKGROUND OF THE INVENTION

In the past numerous attempts have been made to provide improved windows for use in high speed vehicles, such as passenger automobiles, buses, railway cars, aircraft, boats and others. Some of such prior art windows have employed frames with seats in which the window glass is set in an adhesive setting compound, while others mount the glass in other ways, such as in or between frames. The constant vibration and the many and varied stresses to which such windows are subjected in use, combined with the requirement that they remain wind and weather tight, strong and rattle free in use, present many problems, and a failure in any of the foregoing requirements by any one of the many windows in each vehicle is a potential source of trouble, owner and passenger dissatisfaction, and expense.

SUMMARY OF THE INVENTION

A primary objective of the present invention is to provide a vehicle window which is substantially flush with the exterior of the vehicle, seals tightly against weather, is rattle free, strong, of simple, pleasing appearance, capable of being easily adjusted, relatively tamper proof, and permits easy adjustment or replacement of the window glass.

The invention provides a vehicle window wherein a frame, which may be an extrusion, is provided around the inner side of a window opening and has an angle seat in which to receive a rubber bezel fitted marginally around a window glass. Adjustable pressure applying means are removably mounted to the frame in position to force the bezel to seated, sealing relation in its seat, and also provide for easy adjustment or replacement of the window glass and its bezel as required. A removable shield covers and conceals operative features of the window for improved appearance and to prevent tampering.

BRIEF DESCRIPTION OF THE DRAWINGS

The foregoing objectives and advantages of the invention will be apparent from the following description and the accompanying drawings, wherein.

DETAILED DESCRIPTION OF THE DRAWINGS

Figure 1:
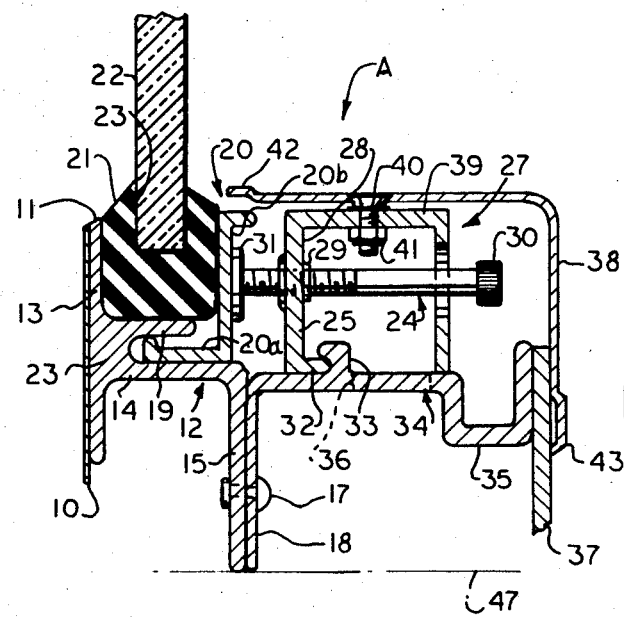
FIG. 1 is a fragmentary, sectional view taken transversely through a marginal portion of a car window embodying the invention.

Referring to the drawings in detail, a car window structure A, see FIG. 1, is mounted on the inner side of the sheet metal outer wall or shell 10 of a car body, not otherwise shown, and substantially flush with the edge of a window opening 11 therein. For the purposes of the present description, the fragment of window structure shown in each figure of the drawing, and described herein in such terms as "up", "down", etc., is assumed to be the bottom or sill portion of the window. However, all four sides of the window structure may be identical. Also, such terms as "inner" and the like mean laterally toward a vertical, longitudinal mid-plane of the car, while "outer" and the like mean laterally away from such mid-plane.

An extrusion 12 of suitable material, such as, for example, aluminum, has an outer portion 13 with flat outer face which fits against the inner side of the outer car wall or shell 10 and is securely attached thereto as by bonding, welding, riveting or other suitable means which provides a secure, weather tight joint therebetween. In the event that the car wall is made of extruded strakes of aluminum or other suitable material the portion 12 may be integral with the strake. As used herein the term "extrusion" is intended to include other forms of fabrication if desired, such as cast, molded, machined, formed, etc.

From the outer portion 13 of the extrusion 12, a web 14 extends inwardly, and then downwardly at 15, where it is connected by rivets 17 to the downturned flange 18 of an inner extrusion 34. It will be obvious to those familiar with structures of this type that the extrusions 12 and 34 may be integral if desired.

A short flange 19 extends inwardly from the outer portion 13 of extrusion 12 in upwardly spaced relation to the web 14, to receive between the web 14 and the flange 19 the bottom flange 20a of a Z-section pressure strip 20. The flat, intermediate portion 20b of the Z-section strip 20 is fitted against the inner side of a resilient bezel 21, which may be an extrusion, fitted around the peripheral edge of a suitable or conventional car window glass 22, the bezel having a groove 23 therein into which the marginal edge of the window glass is fitted.

A thumb screw 24 is screwed through a threaded opening provided in the outer flange 25 of an inverted, channel shaped member or clip 27, and also passes through a co-axial hole provided in the inner channel flange 28. As illustrated, nut inserts 29 of a well known type provide the threads for the thumb screws 24, but if the material of the flange 28 is suitable, a threaded hole may be provided directly therein. The inner end of each thumb screw 24 has a knurled head 30, while the outer end of each such screw may have a usual pressure pad 31 thereon. The pressure pads bear on the central portion 20b of the Z-section strip 20 and thereby urge the latter outwardly, forcing the bezel 21, with required seating, sealing pressure, into its seat.

The lower edge of the outer channel flange 25 is bent inwardly at 32 and has hooked engagement with a short, outwardly turned flange or bead 33 formed on the portion of the extrusion 34 which extends inwardly from extrusion 12 and supports the screw mounting members 27 thereon.

The inner edge of extrusion 34 has an integral, upwardly open channel portion 35 formed thereon, and this latter channel portion is connected to the usual car wall liner 37 by suitable means, for example, bonding, riveting or welding.

An angle shield 38 of suitable sheet material, such as aluminum, is removably attached on top of the bases 39 of the inverted channel members 27 by countersunk head screws 40, which fit into countersunk holes provided in the shield 38 and are screwed into nuts 41 secured to the under side of each channel base 39, each in register with an oversize hole provided therefor.

The outer edge portion 42 of the top flange of angle shield 38 is offset upwardly slightly to clear the bezel 21 and admit temperature controlled air for heating and cooling therebetween. Holes 36 are provided in member 34 to admit heated or cooled air from the space between the shell 10 and liner 37, which serves as a plenum for conventional, forced air heating and cooling means, not shown. A stiffening, decorative bead 43 is also provided along the lower edge of the inner flange of this same angle shield.

OPERATION

In the form of the invention shown in FIG. 1, an extrusion 12 in the form of a frame is connected in weather sealed relation along the interior of each edge of each window opening 11 in the car body shell 10 as shown and described previously herein. In order to mount a window glass 22 in the seat thus provided, a resilient bezel 21 is fitted marginally around each window glass 22, and such window glass, with the bezel thereon, is then inserted laterally outwardly, from the interior of the car, into the angle seat provided by the extrusion outer portion 13 and the flange 19.

A Z-section pressure strip 20 is then mounted with its flat, intermediate portion 20b fitted against the exposed inner face of its bezel 21, and channel members 27 are then mounted on the inward frame extension 34, with the bent lower portion 32 of the outer channel flange of each channel member in hooked, interlocking engagement with the outwardly hooked bead 33. The screws 24 are then screwed axially outwardly to urge the Z-section strip into pressure relation with the bezel 21, and thereby force the bezel into snug, weather tight, seated condition in its seat. This same action interlocks the inturned lower edge portion 32 of each screw support member 27 to the extrusion bead 33. The screws 24 are all screwed to substantially equal torque in order to equalize the pressure applied thereby, through the Z-section strip 20, to the bezel 21. The angle shield 38 is then mounted as shown in FIG. 1 and described previously herein to complete the installation.

Figure 2:
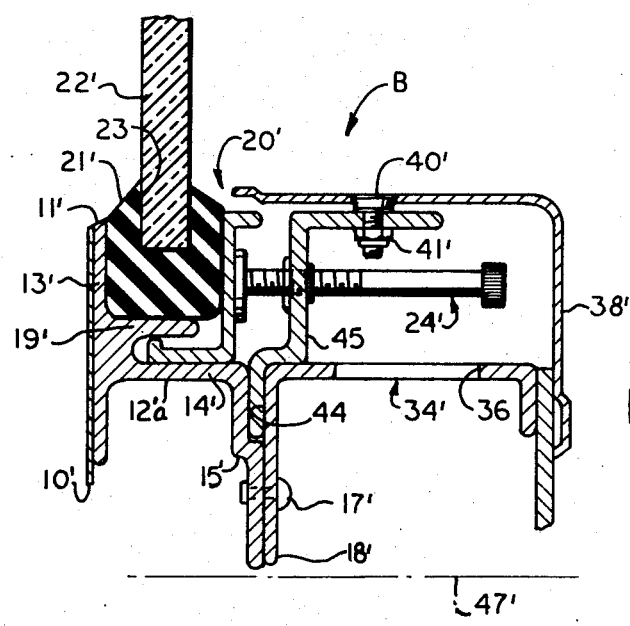
FIG. 2 is a similar sectional view showing a modified form of the invention.

In the modified form of the invention shown in FIG. 2, a car window structure B is generally similar to that shown in FIG. 1 and with generally corresponding parts. Various parts of FIG. 2 are, therefore, designated by the same reference numerals as their respective counterparts in FIG. 1 with the prime (') added. In the structure of FIG. 2 a groove 44 is provided between the extrusions 12' and 34' to permit the insertion therein of the lower portion of a thumb screw support strip 45, which performs the same function as the inverted channel 27 of FIG. 1. Tightening of the screws 24' bends the strip in the groove 44. From the foregoing, the structure and operation of FIG. 2 will be clear to one having an understanding of FIG. 1. Further detailed description of FIG. 2 is, therefore, omitted.

It is apparent that the invention, as embodied in the structure of either FIG. 1 or FIG. 2, can be duplicated if desired for a mullion separating two adjacent windows by duplicating the structure of either figure by a "flip-over" of the drawing about broken line 47 or 47', respectively, as an axis.

Having thus described my invention, what I claim as new and useful and desire to secure by U. S. Letters Patent is:

1. A window structure for mounting in a window opening in a car comprising
   an extrusion having an outer portion extending substantially flush alongside an edge of such window opening,
   a relatively long web extending inwardly from the outer portion of the extrusion,
   a short flange spaced toward the center of the window opening from the web, to define, with the extrusion outer portion, an angle seat alongside the edge of such window opening,
   a window glass surrounded by a resilient bezel fitted marginally thereto, the bezel being also fitted into such angle seat,
   a presser strip of simple Z-cross-sectional shape with one terminal flange thereof inserted in the space between the web and the short flange, and its intermediate portion applied to the inner face of the bezel,
   a screw support member on the web,
   a screw screwed through a threaded hole provided in each screw support member and in endwise bearing engagement with the intermediate portion of the Z-section strip for urging the bezel to seated, weathertight condition in its seat, said support member having a substantially horizontal portion spaced upwardly from said web, and
   a shield of sheet material and of angle cross sectional shape, one flange of which is substantially vertical and is seated on the inward side of the window frame, and the other flange of which extends outwardly from the edge of said one flange nearest the center of the window opening, and is supported on, and releasably attached to, the horizontal portion of the support member to define, with the web and the Z-section strip, a portion of a plenum chamber for the passage of heating and cooling air, the outer edge of said other flange being spaced from the bezel to admit selected heating and cooling air from such plenum chamber to exit therebetween.

* * * * *